United States Patent [19]

Packo et al.

[11] 4,442,015

[45] Apr. 10, 1984

[54] SELF-SEALING REFRIGERANT

[75] Inventors: Joseph J. Packo, 11000 Onion Creek Ct., Austin, Tex. 78747; Donald L. Bailey, Traverse City, Mich.

[73] Assignee: Joseph J. Packo, Austin, Tex.

[21] Appl. No.: 397,191

[22] Filed: Jul. 12, 1982

[30] Foreign Application Priority Data

May 31, 1982 [JP] Japan ................................ 57-092931

[51] Int. Cl.$^3$ ............................................... C09K 5/04
[52] U.S. Cl. ........................................ 252/68; 252/72; 106/33; 556/410; 556/426
[58] Field of Search ...................... 252/68, 72; 106/33; 556/410, 426

[56] References Cited

U.S. PATENT DOCUMENTS

| | | | |
|---|---|---|---|
| 2,259,875 | 10/1941 | Bent et al. | 166/294 |
| 3,580,939 | 5/1971 | Ceyzeriat et al. | 556/410 |
| 4,237,172 | 12/1980 | Packo et al. | 106/33 |
| 4,304,805 | 12/1981 | Packo et al. | 156/94 |
| 4,331,722 | 5/1982 | Packo et al. | 106/33 |

OTHER PUBLICATIONS

Kirk-Othmer Encyclopedia of Chemical Technology, 2nd Ed., Interscience, N.Y., vol. 17, pp. 295-308, Esp. 300, 301.

*Primary Examiner*—John E. Kittle
*Assistant Examiner*—Robert A. Wax
*Attorney, Agent, or Firm*—Browdy and Neimark

[57] ABSTRACT

Refrigeration fluid compositions for refrigeration and air-conditioning circuits include a usual refrigerant fluid together with a liquid, hydrolyzable organosilane which remains in the liquid phase throughout the air-conditioning circuit, and which is capable of removing moisture from the interior of the circuit and sealing leaks.

15 Claims, No Drawings 4,442,015

SELF-SEALING REFRIGERANT

FIELD OF THE INVENTION

The present invention relates to sealing leaks in air conditioning and refrigeration circuits and the like and, more particularly, to self-sealing refrigerant compositions and their use. It is related to copending application Ser. No. 269,969 filed June 3, 1981.

BACKGROUND OF INVENTION

In an article in the Federal Register, Vol. 45, No. 196, Oct. 7, 1980, entitled "Ozone-Depleting Chlorofluorocarbons; Proposed Production Restriction" by the Environmental Protection Agency, it is indicated that the amount of chlorofluorocarbons (CFC) emissions is of great concern to the environment, particularly with respect to its potential for ozone depletion. The problem is of such potential significance that even the banning of CFC has been considered.

CFCs are synthetic compounds which were developed in the 1930's. They are stable, non-flammable, and relatively non-toxic, which make them highly desirable from a worker and consumer safety standpoint. They are used in many applications because of their energy efficiency. Major CFC uses include use in air conditioning and refrigeration circuits, as well as for the freezing of foods.

Quite apart from future growth in the economy and in the refrigeration industry, CFCs currently have an immense economic impact on the U.S. economy, and the industry provides a substantial work force. Thus, based on statistics presently available, about 500 million dollars worth of CFCs are used annually; more than 780 thousand jobs are directly related to CFC usage; approximately 260 thousand domestic businesses, mostly small businesses, use CFCs; the total value of goods and services that depend on CFCs exceed 28 billion dollars annually; the installed value of products that use CFCs is more than 135 billion dollars. In addition, CFCs are the basis of a major U.S. export market that would be jeopardized by restrictions on CFC usage because of emissions (leakage) of CFCs.

One of the major problems in existence relating to the use of CFCs is the leakage of the CFCs from refrigeration and air conditioning units. It can be easily seen that if restrictions were imposed because of such leakage, the impact on the economy would be enormous. However, even without a ban on the use of CFCs, a substantial economic loss is caused by the leakage and consequent replacement of CFCs in air conditioning and refrigeration systems. Moreover, there is a further economic loss because of additional demand of electrical energy caused by inefficient operation of cooling and refrigeration systems from which CFCs have leaked and have not been replaced. In this latter regard it has been estimated that if CFCs were banned, the adverse energy impact, caused by the inefficient operation of refrigeration and air conditioning units, would be equivalent to nearly 240 million barrels of oil by 1990, a figure which constitutes about 45% of current annual production from Alaska's North slope, or about 10% of the total United States crude oil imports in 1978.

In addition to the problems caused by refrigerant leakage as noted above, there are other known disadvantages including the inconvenience and cost of replacing refrigerant from a circuit from which it has already leaked. These problems exist not only relative to the use of CFCs as refrigerants, but also to all other refrigerant fluids. It is, accordingly, clear that it would be desirable to eliminate leakage of refrigerant fluids from air conditioning and refrigeration systems.

It should be understood that many difficulties in refrigerating and air conditioning circuits can be traced to the presence of moisture in the system. Moisture, usually considered acceptable in the art if present in quantities less than 15-25 parts per million, causes many problems as it circulates through the circuit in the presence of oil and the refrigerant, particularly at high temperatures which may be reached in the compressor and condensor. Thus, moisture may freeze at the refrigerant control orifice, causing clogging. Indeed, if moisture is present in large enough quantities, it will form ice in capillary tubes and expansion valves, plugging them. Water may also cause chemical breakdown of the oil, refrigerant and motor winding insulation and may create acids which ruin the motor winding. It has been estimated that approximately 80% of all problems requiring air conditioning and refrigeration repairs are traceable to the presence of small quantities of moisture in the circuit.

To solve the difficulties caused by excess moisture, it is conventional to provide dehydrators or dryers in air conditioning and refrigeration circuits. These devices, of course, increase the cost of the systems.

RELATED INVENTION

In copending application Ser. No. 269,969, a self-sealing refrigeration fluid is disclosed comprising a refrigerant and a quantity of volatilizable or volatile organosilane, desirably of the types set forth in U.S. Pat. Nos. 4,237,172; 4,304,805 and 4,331,722. The organosilane is suitably premixed with the refrigerant and the composition is charged to a refrigeration or air conditioning circuit.

SUMMARY OF INVENTION

It is now been discovered that the organosilane need not be volatile or even volatizable at normal temperatures and pressures. Indeed, it has been discovered that the objects of copending application Ser. No. 269,969 can be realized with the use of hydrolyzable and possibly polymerizable organosilanes which, in the environment of the refrigeration or air conditioning circuit, remain in the liquid state in both the vapor and liquid portions of the circuit.

It has also been discovered that these liquid organosilanes carry out two additional important functions when utilized in refrigeration and air conditioning circuits in conjunction with refrigerant fluid. These two additional functions are, first, the hydrolyzable organosilanes act as dehydrating agents to remove traces of water from the circuits, and second, they serve as neutralizing agents to reduce and minimize the adverse effects created by traces of acids which sometimes exist in the refrigeration and air conditioning circuits.

Thus, the present invention has specific advantages in addition to sealing leaks in the refrigeration system. Hydrolyzable silanes, silicones containing hydrolyzable substituents and organic materials containing silicon-substituted hydrolyzable substituents chemically react with water present within the circuit thereby making the system dry. This prevents the formation of ice crystals in the expansion valve or capillary tube which may restrict the flow of refrigerant or in severe cases stop it altogether. Traces of moisture also may cause rusting, corrosion, refrigerant decomposition, oil sludging or general deterioration of the system. There is general agreement among those skilled in refrigeration technology that the less water the better. Acids, particularly inorganic acids, are much more corrosive in the presence of moisture than in a dry system. Since hydrolyzable silanes and silicones are effective scavengers for moisture they not only reduce the water content of refrigeration systems to negligible amounts but also remove any additional moisture introduced during their operation.

The present invention solves the aforementioned problems without the necessity of using mechanical dehydrators or dryers. This is accomplished through the reaction between water present in the system and liquid organosilane.

The invention accordingly involves not only sealing external leaks in the circuit which already exist or which may develop in the future, but also removing moisture and neutralizing acid thereby improving the performance and efficiency of the system. This is accomplished by introducing into the interior of the circuit the liquid organosilane either alone or in admixture as mentioned above, and pressurizing the interior of the system which is inherently effected by feeding to the system the refrigerant.

It is, accordingly, an object of the invention to overcome deficiencies in the prior art, such as those indicated above.

It is another object of the present invention to prevent or at least inhibit leakage of refrigerant fluids from refrigeration and air conditioning circuits.

It is a further object of the invention to provide self-sealing refrigerant compositions.

It is still another object of the invention to reduce and inhibit the adverse effects of water and acids present in air conditioning and refrigeration circuits.

It is yet a further object of the invention to provide self-sealing refrigerant compositions embodying liquid sealants, which sealants may also serve as dehydrating and neutralizing agents.

It is still a further object of the invention to provide self-sealing refrigerant concentrates comprising relatively large quantities of the non-volatile sealant.

DETAILED DESCRIPTION OF EMBODIMENTS

As noted above, the invention is useable in all systems having refrigeration or air conditioning circuits, including commercial, home and automobile air conditioning units; refrigeration and freezing circuits, including home freezers and refrigerators, commercial freezers and refrigerators; etc.

A "refrigerant" as used herein is any liquid substance which, by undergoing a change of phase to the vapor phase, lowers the temperature of its environment because of its latent heat. The instant invention can be utilized in conjunction with any refrigerant, the only restriction being that the refrigerant and the liquid sealing agent used in conjunction therewith must be inert and compatible with respect to one another. As refrigerants, there may be briefly mentioned the CFCs, including $CCl_3F$ (Refrigerant 11), $CCl_2F_2$ (Refrigerant 12), $CClF_3$ (Refrigerant 13) $C_2Cl_3F_3$ (Refrigerant 113), $C_2Cl_2F_4$ (Refrigerant 114) $CHClF_2$ (Refrigerant 22), Refrigerant 500 (azeotropic mixture of 73.8% $CCl_2F_2$ and 26.2%—$CH_3CHF_2$), Refrigerant 502 (azeotropic mixture of 48.8%—$CHClF_2$ and 51.2% $CClF_2 CF_3$), Refrigerant 503 (mixture of 40% by weight $CHF_3$ and 60% $CClF_3$), Refrigerant 31/114 (mixture of 55% by weight $CH_2ClF$ and 45% by weight $C_2Cl_2F_4$), Refrigerant 12/31 (mixture of 78% by weight $CCl_2F_2$ and 22% by weight $CH_2ClF$), such refrigerants being commonly called "Freons"; ammonia, sulfur dioxide; ethyl or methyl chloride; dimethyl ether; and even binary mixtures such as methyl chloride together with dimethyl ether, and carbon dioxide together with nitrous oxide. With regard to the latter mentioned binary mixtures, they were proposed many years ago but were abandoned because one component of the mixture leaks more rapidly than another and when this occurs pressure readings become impossible to interpret; the instant invention solves this particular problem in that it eliminates leakage. It will, on the other hand, be understood that the invention is of particular interest where the refrigerant fluid is a CFC or ammonia, as these are by far the most commonly used refrigerants.

As noted above, the sealant is an hydrolyzable liquid organosilane, which liquid hydrolyzable organosilane may also be polymerizable. Such a liquid organosilane or silicone remains in the liquid phase even when the refrigerant is in the vapor phase. While the liquid organosilane must be inert and compatible with respect to the refrigerant in the sense that the refrigerant and the organosilane should not interfere with one another, they need not be compatible with one another in the sense of mutual solubility or miscibility.

The liquid organosilane may be one which, in the liquid portion of the circuit, exists either in a colloidal state suspended in the liquid refrigerant or which is dissolved in the refrigerant with which it is miscible, but which organosilane may exist as atomized or as a mist in the gaseous portions of the circuit. On the other hand, the organosilane may exist in the gaseous portions of the circuit as a thin liquid film on the interior of the pipe, either alone or in admixture with lubricating oil. In any event, the organosilane is a liquid which is hydrolyzable so as to react with water vapor in the air at the the situs of a leak in the air conditioning or refrigeration circuit, regardless of whether the leak occurs in the liquid portion or the gaseous portion of the circuit.

In general, the liquid organosilane used in accordance with the instant invention may be described as a silicon-substituted monomeric and polymeric liquid or mixture thereof containing at least two silicon-bonding hydrolyzable substituents selected from the group consisting of alkylamino, dialkylamino-, mercapto-, acyloxy-, alkyloxy-groups and the like. Preferably, on the average there are slightly more than two such hydrolyzable substituents.

In general, use of these organosilane or silicone liquids in the air conditioning and refrigeration circuit accomplishes the following results: acids in the system are neutralized; the pH of the fluid becomes stabilized; corrosion, rust and oxidation are inhibited by removal of internal water; the life of the equipment is prolonged; loss of refrigerant is stopped; cooling efficiency is improved; lubrication is improved; and energy is saved.

The amount of silane or silicone liquid used in the present invention is not critical provided the amount present is more than sufficient to react with residual moisture in the system and is adequate for forming effective seals at the site of any leaks which may be present. If the refrigeration system is dry, small amounts of the liquid organosilane can be effective. Generally, it is advisable to use a 200–1000 percent molar excess of additive based on the moisture likely to be present in the system. This prevents the possibility of cross-linked polymers forming in the internal parts of the refrigeration circuit which could adversely affect operation of the equipment.

The compositions of the present invention may be provided in a wide range of concentrations, depending on whether the composition is to be used "as is", as a self-sealing refrigerant or as a concentrate either for addition to an already existing circuit for "make up" purposes or for addition to a new or empty circuit in combination with conventional refrigerant. Thus, compositions in accordance with the invention may comprise from 100 ppm (parts per million), i.e. 0.01% of organosilane sealant to 100% sealant, the remainder if any being refrigerant fluid and/or lubricant liquid. For compositions to be used at or near full strength, the concentration may range from 100 ppm to 10% sealant, preferably 0.5% to 1% sealant, with the remainder being refrigerant plus optionally lubricant liquid, e.g. oil. Concentrates may have a wide range of concentration, normally ranging from 5-99% of the organosilane liquid or even more.

If desired, small amounts of other additives may also be included, so long as the other additives do not interfere with the capacity of the fluid to act as a refrigerant and do not adversely affect the capacity of the organosilane to carry out its function as sealant. For example, the composition may include, as such an additive, an odoriferous material which serves as a leak detecting agent or odorant, such as peppermint, or a foul smelling compound such as a mercaptan. As noted above, lubricating oil may also be present. On the other hand, in view of the fact that the compositions of the invention are self-sealing, the need for an odorant is reduced in comparison with the need in the prior art.

Accordingly, the essential ingredients of the composition are the refrigerant itself and and the silicone or organosilane liquid or mixture thereof, it being necessary that the sealant be inert and compatible with respect to the refrigerant and the equipment used. From a functional point of view, the mixture of the refrigerant and sealant must be capable of sealing external leaks in the piping of the circuit, both in the vapor phase and liquid phase portions of the circuit.

The organosilane sealants referred to above and utilizable in the instant invention are of a type in which the sealant, upon escape through a leak into the ambient environment, reacts with oxygen and/or moisture present in the outside environment to form a solid seal at the site of the leak. Essentially the organosilane liquid hydrolyzes and/or polymerizes to form a crosslinked silicone polymer or polysiloxane seal at the leak site. It will be understood that, in view of its usage, the organosilane liquid should be environmentally acceptable, non-corrosive and sufficiently stable so that storage presents little difficulty.

In addition to the composition as described above, the invention also involves the method of sealing leaks in closed refrigeration and air conditioning circuits in order to contain the refrigerant fluid without leakage therefrom. This method involves the steps of introducing into the interior of the circuit the liquid organosilane either alone or in admixture with either or both of a compatible refrigerant and a compatible lubricating oil, applying pressure to the interior of the circuit sufficient to permit escape of the liquid sealant through any holes in the circuit piping into the ambient environment at the prevailing humidity conditions and for a period of time sufficient to cause the liquid sealant to react with moisture and/or oxygen present in the ambient environment to form a solid seal at the situs of the leak.

The method of introducing the hydrolyzable silane or silicone additive into the refrigeration system is not critical. It can be mixed with the refrigerant, with the lubricating oil or directly injected into the system. Generally the most convenient method is to recharge the system with refrigerant fluid containing the additive in accordance with known procedures used for charging other refrigerating fluids. By use of large amounts of silane additives with hydrolyzable group functionality, it may not be necessary to dry the system. However, when charging hydrolyzable silanes or silicones to the system, it is preferable that the system be dried and freed of moisture to prevent premature hydrolysis with subsequent polymerization and cross-linking of these additives. Where the refrigeration system has been open to atmospheric moisture, or where the drier has become wet, replacement of the drier in addition to evacuating the system of moisture is necessary. In charging these compositions to air conditioning or refrigeration units containing chlorofluorocarbons as refrigerants, such refrigerants should be slowly added in the liquid state, to ensure adequate lubrication of the compressor. Otherwise, the solvent action of the refrigerant can remove oil needed for lubrication of the compressor.

The selection of a particular refrigerant and sealant will depend on the type of equipment and the service requirements. The type of refrigerant will be known to those skilled in the refrigerating and air conditioning arts. Examples of suitable sealants for use in the present invention of the type which react with oxygen and/or moisture present in the ambient environment to form a seal at the site of the leak, and which further react with moisture present within the circuit, and which remain liquid in both the liquid and vapor parts of the circuit, are known per se as being useful as intermediates in producing room temperature vulcanizing silicone elastomers, except that no silica fillers are used in the instant invention. Of these known materials, those having lower molecular weights are preferred, it being understood that the viscosity must be sufficiently low to permit the functions of the instant invention to be carried out. Some such materials are disclosed in U.S. Pat. Nos. 3,035,016; 3,632,793; 3,691,256; 3,032,528; 3,464,951; 3,923,736; 3,451,964; 3,519,601; and 3,535,357.

Examples of suitable organosilanes which remain substantially in the liquid phase throughout the surface and which function in the vapor-containing portions of the circuit by wetting the surfaces of the pipes and/or by existing in the atomized state are as follows:

A. Silanes and mixtures of silanes having at least two silicon bonded hydrolyzable substituents selected from the class consisting of alkylamino-, dialkylamino-, mercapto-, acyloxy-, alkoxy-, amido-, aminoxy-, oximo- groups and the like.

Examples are:
1. Alkylaminosilanes
   (a) Bis-(cyclohexylamino)methylsilane

   $CH_3SiH(-NHC_6H_{11})_2$ (b) Phenyltris-(butylamino)silane

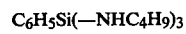
   $C_6H_5Si(-NHC_4H_9)_3$

2. Dialkylaminosilanes
   (a) Amyltris-(dibutylamino)silane $C_5H_{11}Si[N(C_4H_9)_2]_3$ (b) Hexakis-(dimethylamino)disilylethane $[(CH_3)_2N]_3SiC_2H_4Si[N(CH_3)_2]_3$ (c) Cyanoethyltris-(dimethylamino)silane $NCC_2H_4Si[N(CH_3)_2]_3$ 3. Mercaptosilanes
   Phenyltris-(mercaptoethyl)silane $C_6H_5Si(SC_2H_5)_3$ 4. Acyloxysilanes
   (a) Methyltriacetoxysilane $CH_3Si(OOCCH_3)_3$ (b) Vinyltriacetoxysilane $CH_2=CHSi(OOCCH_3)_3$ 5. Alkoxysilanes
   (a) Hexaethoxydisilylethane $(C_2H_5O)_3SiC_2H_4Si(OC_2H_5)_3$ (b) Methylbis-(cyclohexylamino)methoxysilane $CH_3Si(NHC_6H_{11})_2(OCH_3)$ (c) Aminopropyltriethoxysilane $H_2NC_3H_6Si(OC_2H_5)_3$ 6. Amidosilanes $CH_3Si[N(CH_3)COCH_3]_3$ 7. Aminoxysilanes $CH_3Si[ON(C_2H_5)_2]_3$ 8. Oximosilanes $CH_3Si[ON=C(CH_3)(C_2H_5)]_3$ B. Silicone polymers having at least two silicon-bonded hydrolyzable substituents selected from the class consisting of alkylamino-, dialkylamino-, mercapto-, acyloxy-, alkoxy-, amido-, aminoxy-, oximo-, disilazanyl-, disilthianyl-groups and the like.

1. Liquid, preferably non-viscous polymers, such as the following wherein R is selected from the group consisting of alkylamino-, dialkylamino-, mercapto-, acyloxy-, alkoxy-, amido-, aminoxy- and oximo-groups where R is such a group (a) $R_2SiCH_3O[Si(CH_3)_2O]_nSiCH_3R_2$ n=0–1000

(b) $RSi(CH_3)_2O[Si(CH_3)_2O]_nSiCH_3R_2$ n=0–1000

(c) $R_2SiC_2H_5O[SiR(C_2H_5)O]_nSiC_2H_5R_2$ n=0–50

(d) $(CH_3)_3SiO[Si(CH_3)(C_2H_4SiR_3)O]_nSi(CH_3)_3$ n=1–10

2. Polymers with disilazanyl-groups $R_2SiC_2H_5NH[SiRC_2H_5NH]_nSiC_2H_5R_2$ n is zero or an integer
   R is a hydrolyzable group 3. Polymers with disilthianyl groups $CH_3R_2SiS\left[\begin{array}{c}R\\SiCH_3S\end{array}\right]_nSiCH_3R_2$ n is zero or an integer
   R is a hydrolyzable group C. Silicon-substituted organic polymers having at least two silicon-bonded hydrolyzable substituents selected from the class consisting of alkylamino-, dialkylamino-, mercapto-, acyloxy-, alkoxy-, amido-, aminoxy-, oximo-groups and the like.

1. $R_3SiC_3H_6O(C_3H_6O)_nC_4H_9$ n is an integer
   R is a hydrolyzable group

2. $CH_3CH_2(SiR_3)[C_2H_4(SiR_3)]_nC_2H_5$ n is an integer
   R is a hydrolyzable group 3. $R_3SiC_{18}H_{36}SiR_3$ R is a hydrolyzable group D. Mixtures of the silanes and silicone polymers defined above.

$RSi(CH_3)_2O[Si(CH_3)_2O]_nSi(CH_3)_2R$ plus $CH_3SiR_3$ n is zero or an integer
R is a hydrolyzable group E. Mixtures of the silanes and silicon-substituted organic polymers described above.

It should be understood that in general the liquid organosilane sealant or mixture must have the following characteristics: It must be compatible with the selected refrigerant fluid and the materials from which the circuits are formed, in the sense that it must not interact to change the character of the refrigerant fluid or the circuit material; it must not interfere to a substantial degree, in the quantity present, with the properties of the refrigerant which make it suitable as a refrigerating fluid; it must exist as a liquid throughout both the liquid and gaseous portions of the circuit, and must be capable of carrying out its sealing function by hydrolyzing in contact with moisture to form a solid seal wherever a leak may develop throughout the entire circuit; it must be capable of dehydrating the refrigerant by hydrolysis when in contact with moisture and condensation of the silanol groups formed to produce a silicone oil or polysiloxane; it should not be a dangerous pyrophoric material; it should be non-corrosive and sufficiently stable so that storage presents little difficulty; and desirably it should be environmentally acceptable.

The following examples further illustrate without limiting the nature of the invention:

EXAMPLE 1

A mixture is formed consisting of 95% of refrigerant 12 and 5% of a mixture of bis-(cyclohexylamino)methylsilane. The mixture is charged, under pressure, into a conventional can used for charging automobile air-conditioning units. The mixture is then discharged from the can into an automobile air-conditioning unit.

EXAMPLE 2

Similar to Example 1, a refrigerant composition is prepared for large industrial and commercial systems, including 99.5% refrigerant 11 and 0.5% of a liquid organosilane sealant formed of equal proportions of phenyl tris-(butylamino)silane and amyl tris-(dibutylamino)silane.

EXAMPLE 3

Similar to Examples 1 and 2, a refrigerant fluid mixture of 99.8% refrigerant 22 together with 0.2% of a mixture of 9 parts by weight of hexakis-(dimethylamino)disilylethane and 1 part by weight of methyltriacetoxysilane.

EXAMPLE 4

A concentrate is prepared for commercial freezers and display cases comprising 50% refrigerant 502 and 50% organosilane. As the organosilane is used a mixture of 1 part by weight of volatilizable bis-(dimethylamino)-methylsilane and 3 parts by weight of liquid vinyltriacetoxysilane.

EXAMPLE 5

A mixture is formed of 99% of ammonia and 1% of a low molecular weight, low viscosity silicone polymer of the formula $R_2SiCH_3O[Si(CH_3)_2O]_nSiCH_3R_2$ wherein R is methylamino and n is on the average 15.

EXAMPLE 6

In sequence there is charged to an air-conditioning unit first a charge of amyl tris-(dibutylamino)silane followed by a charge of refrigerant 22. The quantity of refrigerant 22 utilized is 100 times the quantity of liquid organosilane.

EXAMPLE 7

Similar to the preceding example, there is charged in sequence first a mixture of equal proportions of lubricating oil and phenyl tris-(mercaptoethyl)silane, followed by a charge of refrigerant 22.

EXAMPLE 8

A mixture is formed of 98% refrigerant 12, 1% lubricating oil and 1% of cyanoethyl tris-(dimethylamino)silane.

As should be clear from the above description, the liquid organosilanes of the instant invention seal not only existing leaks in air-conditioning and refrigeration circuits, but such compositions also prevent leaks from developing both by eliminating moisture and inhibiting the effects of acid within the circuit and also by causing very small leaks to become sealed as soon as they develop at the sites of the incipient leaks.

The foregoing description of specific embodiments will so fully reveal the general nature of the invention that others can, by applying current knowledge, readily modify and/or adapt for various applications such specific embodiments without departing from the generic concept and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A leak sealing, leak preventing and moisture removing refrigeration fluid composition for refrigeration and air-conditioning units, comprising:
    (a) a material selected from the group consisting of a refrigerant fluid which ammonia or chlorofluorocarbon, a lubricating fluid and a mixture thereof; and
    (b) a liquid sealant for removing moisture from the interior of the refrigeration or air-conditioning circuit and for forming a seal at the site of a leak in such a circuit, said sealant being a liquid hydrolyzable organosilane or mixture thereof compatible with said refrigerant fluid, which does not substantially interfere with the properties of the refrigerant fluid, which exists as a liquid both in the liquid portion of the circuit and the gaseous portion of the circuit, and which is substantially inert to the material from which the circuit is made, said organosilane sealant being selected from silanes and mixtures of silanes having at least two silicon-bonded hydrolyzable substituents selected from the group consisting of alkylamino-, dialkylamino-, mercapto-, acyloxy-, alkoxy-, amido-, aminoxy-, and oximo-groups; low molecular weight, low viscosity silicone polymers having at least 2 silicon-bonded hydrolyzable substituents selected from the group consisting of alkylamino-, dialkylamino-, mercapto-, acyloxy-, alkoxy-, amido-, aminoxy-, oximo-, disilazanyl- and disilthianyl groups; low molecular weight, low viscosity silicon-substituted organic polymers having at least two silicon-bonded hydrolyzable substituents selected from the group consisting of alkylamino-, dialkylamino-, mercapto-, acyloxy-, alkoxy-, amido-, aminoxy-, and oximo-groups; mixtures of said silanes and said silicone polymers; and mixtures of said silanes and said silicon-substituted organic polymers.

2. A composition according to claim 1, wherein said refrigerant fluid is a chlorofluorocarbon.

3. A composition according to claim 1, wherein said refrigerant fluid is ammonia.

4. A method of sealing leaks in a closed refrigeration or air-conditioning circuit containing a refrigerant fluid therein, comprising introducing into the interior of said circuit a liquid sealant agent comprising a liquid hydrolyzable organosilane or mixture thereof, and applying pressure to the interior of said circuit with a refrigerant fluid, said pressure being sufficient to permit escape of said refrigerant and said hydrolyzable organosilane from the interior of said circuit into the ambient environment for a period of time sufficient to cause said hydrolyzable organosilane to react with moisture present in the environment to form a solid seal at the situs of the leak, said organosilane existing as a liquid in both the liquid and gaseous portions of said circuit.

5. A method of removing moisture, neutralizing acids and sealing existing or future external leaks in a closed refrigeration or air-conditioning circuit containing a refrigerant therein, thereby improving performance and efficiency of the air-conditioning or refrigeration system comprising introducing into the interior of said circuit a liquid organosilane and a refrigerant fluid compatible with said liquid organosilane and inert with respect thereto, said refrigerant fluid effecting pressurizing of the interior of said circuit sufficient to permit escape, when leaks are present, of said refrigerant fluid and said liquid organosilane into the ambient environment at prevailing humidity conditions and for a period of time sufficient to react with moisture present in the external environment and to form a seal at the situs of the leak, said organosilane existing as a liquid in both the liquid and gaseous portions of said circuit.

6. A method according to claim 5, wherein the liquid organosilane and said refrigerant fluid are charged to the interior of the circuit sequentially, with the charging of the refrigerant fluid following the charging of the liquid organosilane sealant.

7. A method according to claim 5, wherein said refrigerant fluid and said liquid organosilane are admixed prior to charging to said circuit.

8. A method according to claim 7, wherein said liquid hydrolyzable organosilane is a silicon-substituted monomeric or polymeric material, or mixture thereof, containing at least two silicon-bonded hydrolyzable substituents selected from the group consisting of alkylamino-, dialkylamino-, mercapto-, acyloxy-, and alkoxy-groups.

9. A composition according to claim 1, wherein said organosilane sealant has carbon atoms all of which comprise substituents which are non-functional.

10. A composition according to claim 2, wherein said organosilane sealant has carbon atoms all of which comprise substituents which are non-functional.

11. A composition according to claim 5, wherein said organosilane sealant has carbon atoms all of which comprise substituents which are non-functional and wherein said refrigerant fluid is a chlorofluoro carbon.

12. A method according to claim 4, wherein said organosilane sealant has carbon atoms all of which comprise substituents which are non-functional.

13. A method according to claim 5, wherein said organosilane sealant has carbon atoms all of which comprise substituents which are non-functional.

14. A leak sealing, leak preventing and moisture removing refrigeration fluid composition for use at full strength for refrigeration and air-conditioning units, comprising:

(i) a liquid sealant for removing moisture from the interior of the refrigeration or air-conditioning circuit and for forming a seal at the site of a leak in such a circuit, said sealant being a liquid hydrolyzable organosilane or mixture thereof compatible with said refrigerant fluid, which does not substantially interfere with the properties of the refrigerant fluid, which exists as a liquid both in the liquid portion of the circuit and the gaseous portion of the circuit, and which is substantially inert to the material from which the circuit is made, said organosilane sealant being selected from silanes and mixtures of silanes having at least two silicon bonded hydrolyzable substituents selected from the group consisting of alkylamino-, dialkylamino-, mercapto-, acyloxy-, alkoxy-, amido-, aminoxy-, and oximo-groups; low molecular weight, low viscosity silicone polymers having at least 2 silicon-bonded hydrolyzable substituents selected from the group consisting of alkylamino-, dialkylamino-, mercapto-, acyloxy-, alkoxy-, amido-, aminoxy-, oximo-, disilazanyl- and disilthianyl groups; low molecular weight, low viscosity silicon-substituted organic polymers having at least two silicon-bonded hydrolyzable substituents selected from the group consisting of alkylamino-, dialkylamino-, mercapto-, acyloxy-, alkoxy-, amido-, aminoxy-, and oximo-groups; mixtures of said silanes and said silicone polymers; and mixtures of said silanes and said silicon-substituted organic polymers, said organosilane liquid comprising 100 ppm to 10% of said composition; and (ii) the remainder being essentially a refrigerant fluid.

15. A leak sealing, leak preventing and moisture removing refrigeration fluid composition for refrigeration and air-conditioning units, comprising:

(a) a mixture of a refrigerant fluid and a lubricant fluid; and (b) a liquid sealant for removing moisture from the interior of the refrigeration or air-conditioning circuit and for forming a seal at the site of a leak in such a circuit, said sealant being a liquid hydrolyzable organosilane or mixture thereof compatible with said refrigerant fluid, which does not substantially interfere with the properties of the refrigerant fluid, which exists as a liquid both in the liquid portion of the circuit and the gaseous portion of the circuit, and which is substantially inert to the material from which the circuit is made, said organosilane sealant being selected from silanes and mixtures of silanes having at least two silicon-bonded hydrolyzable substituents selected from the group consisting of alkylamino-, dialkylamino-, mercapto-, acyloxy-, alkoxy-, amido-, aminoxy-, and oximo-groups; low molecular weight, low viscosity silicone polymers having at least 2 silicon-bonded hydrolyzable substituents selected from the group consisting of alkylamino-, dialkylamino-, mercapto-, acyloxy-, alkoxy-, amido-, aminoxy-, oximo-, disilazanyl- and disilthianyl groups; low molecular weight, low viscosity silicon-substituted organic polymers having at least two silicon-bonded hydrolyzable substituents selected from the group consisting of alkylamino-, dialkylamino-, mercapto-, acyloxy-, alkoxy-, amido-, aminoxy-, and oximo-groups; mixtures of said silanes and said silicone polymers; and mixtures of said silanes and said silicon-substituted organic polymers.

* * * * *

UNITED STATES PATENT AND TRADEMARK OFFICE
CERTIFICATE OF CORRECTION

PATENT NO. : 4,442,015  
DATED : April 10, 1984  
INVENTOR(S) : PACKO et al

It is certified that error appears in the above-identified patent and that said Letters Patent is hereby corrected as shown below:

IN THE CLAIMS

Patent claim 1 (column 10, line 31) insert "is" after "refrigerant fluid which".

Patent claim 10 (column 11, line 52) delete "claim 2" and insert therefor --claim 14--.

UNITED STATES PATENT AND TRADEMARK OFFICE
CERTIFICATE OF CORRECTION

PATENT NO. : 4,442,015
DATED : April 10, 1984
INVENTOR(S) : PACKO et al

It is certified that error appears in the above-identified patent and that said Letters Patent is hereby corrected as shown below:

IN THE CLAIMS (Continued)

Patent claim 11 (column 11, line 55) delete "claim 5" and insert therefor --claim 15--.

Signed and Sealed this

Eleventh Day of December 1984

[SEAL]

Attest:

Attesting Officer

GERALD J. MOSSINGHOFF

Commissioner of Patents and Trademarks